March 12, 1963 L. D. MASSER 3,081,134
OPERATING STRUCTURE FOR AIR BRAKES AND THE LIKE
Filed June 2, 1960 3 Sheets-Sheet 1

INVENTOR.
LLOYD D. MASSER
BY
Barnes, Kisselle, Raisch & Choate
ATTORNEYS

March 12, 1963 L. D. MASSER 3,081,134
OPERATING STRUCTURE FOR AIR BRAKES AND THE LIKE
Filed June 2, 1960 3 Sheets-Sheet 2

INVENTOR.
LLOYD D. MASSER
BY
Barnes, Kisselle, Raisch & Choate
ATTORNEYS

March 12, 1963  L. D. MASSER  3,081,134
OPERATING STRUCTURE FOR AIR BRAKES AND THE LIKE
Filed June 2, 1960  3 Sheets-Sheet 3

INVENTOR.
LLOYD D. MASSER
BY
Barnes, Kisselle, Raisch & Choate
ATTORNEYS

United States Patent Office 3,081,134
Patented Mar. 12, 1963

1

3,081,134
OPERATING STRUCTURE FOR AIR BRAKES
AND THE LIKE
Lloyd D. Masser, Muskegon, Mich., assignor to Neway
Equipment Company, Muskegon, Mich., a corporation
of Michigan
Filed June 2, 1960, Ser. No. 33,482
9 Claims. (Cl. 303—6)

This invention is particularly adapted for use in operating air brakes in heavy duty motor vehicles.

The object of the invention is to provide a relatively inexpensive, compact brake operating structure which has approximately the same size and conformation as conventional structures, but which has improved operating characteristics and has a self-contained auxiliary means for applying parking brakes and for furnishing additional stroke for the thrust rod to compensate for brake fade during unusual braking runs.

Generally the invention employs a piston pneumatically operable in a cylinder to move a thrust rod for operating the brakes of a vehicle. The piston carries bodily a spring and an expansible pressure chamber which holds the spring compressed. The spring has an operative connection with the thrust rod so that it moves the thrust rod independently of the piston for applying brake force upon relief of pressure in the chamber. When pressure is subsequently increased in the chamber, it compresses the spring and relieves the brake force applied by the spring. The parts are arranged so that the spring-applied brake force can be used either for parking brake purposes or to increase the stroke of the thrust rod to compensate for brake fade during an extraordinary brake run. One form of the invention is shown in the accompanying drawings:

Figure 1:
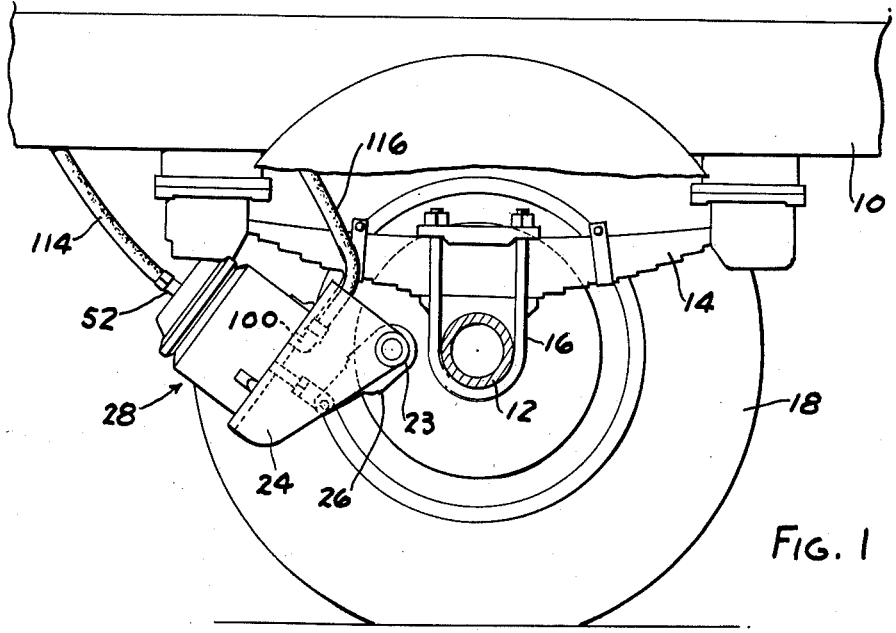
FIG. 1 is a fragmentary generally elevational view of a vehicle having a braking structure according to this invention mounted thereon.
Figure 2:
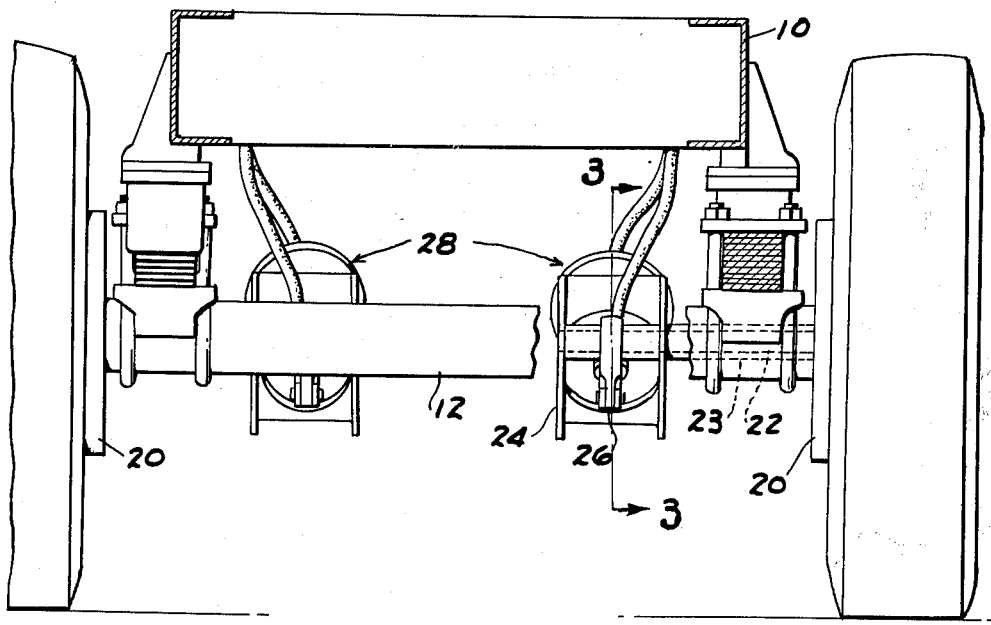
FIG. 2 is a rearward generally elevational view of the vehicle with parts broken away to illustrate the braking structure.

Shown in FIG. 1 is a vehicle frame 10 having an axle 12 suspended therefrom through a conventional spring stack 14 and U-bolt connection 16. Ground engaging wheels 18 are mounted on the axle and brakes 20 on the wheels are operated by shafts 22 journaled in tubes 23 projecting from the brake backing plates and connected to operating levers 26. Brake levers 26 are actuated by braking structures 28 constructed in accordance with this invention and mounted on brackets 24 carried by tubes 23. Each brake structure includes a cylinder 30 adapted to be secured on a bracket 24 as by bolts 32 and a piston 34 movable therein and operably connected to a thrust rod 36 secured to a brake lever 26 through a clevis 38

2 by means of a threaded connection 40 provided for adjustment purposes.

The cylinder shown has a head portion 42 and a skirt portion 44 having portions which are interlocked by bolts (not shown) around the periphery 46 of a diaphragm 48 which provides a sealed chamber 50 within the cylinder. A fitting 52 communicating into the chamber is adapted for connection into the air pressure system for the brakes. A coil spring 54 is compressed between a radial projection 56 on the cylinder interior and an outward projection 58 on the piston exterior which, in the structure shown, comprises bolted-together flanges on a head member 60 and skirt member 62 of the piston. A cylindrical shell 64 cooperates with radial projection 56 to form a cup for retaining spring 54 and this shell also forms a guide within which skirt portion 62 of piston 34 moves. As will be described in more detail, diaphragm 48 acts upon the head 66 of piston 34 under ordinary braking runs to advance thrust rod 36 to actuate the vehicle brakes when pressure is introduced into chamber 50. Spring 54 returns piston 34 when pressure in chamber 50 is relieved.

An annular cup shaped member 68 is axially movably carried within piston 34 and has a radially inward extension 70 connected to the upper end portion 72 of thrust rod 36. Coacting compressed coil springs 74 and 75 within the piston each has one end 76, 77 respectively acting against the bottom 78 of cup 68 and has its other end 80 and 81 respectively reacting against the underside of piston head 66. Thus the springs are biased to urge cup 68 and thrust rod 36 in a direction for applying braking force to brake lever 26. Piston 34 has a central cylindrical shell 82 forming a guide within which thrust rod 36 longitudinally slidably moves. Clearance 83 is provided between the thrust rod and shell 82 so that the thrust rod can move laterally to an extent required by the swinging of its lower end incident to the swinging movement of lever 26. A bellows type dirt seal 84 is preferably secured around thrust rod 36 as illustrated.

Piston 34 carries a second flexible diaphragm 86 fashioned generally into the shape of a torus forming an axially expansible pressure chamber 88. Edge portions 90 of diaphragm 86 are sealingly clamped against radially turned bottom portions 92 of piston 34 by a ring 94 secured in place by bolts 96 one of which has the form of a nipple 98 receiving a fitting 100 through which pressure from the air brake system can be introduced into chamber 88. A radially outer wall portion 102 of the diaphragm is confined by the outer skirt portion 62 of the piston and the inner wall portion 104 of the diaphragm is confined by guide tube 82 for the thrust rod. The top wall 106 of the diaphragm is sealingly secured to the bottom 78 of cup 68 by bolts 108.

The confined spaces in cylinder 30 and piston 34 lying outside of chambers 50 and 88 are vented by openings 109, 110, and 111 in cylinder 44, cup 68, and piston skirt 62 respectively. Cylinder 30 also has a drain opening 112 for condensed moisture.

Figure 3:
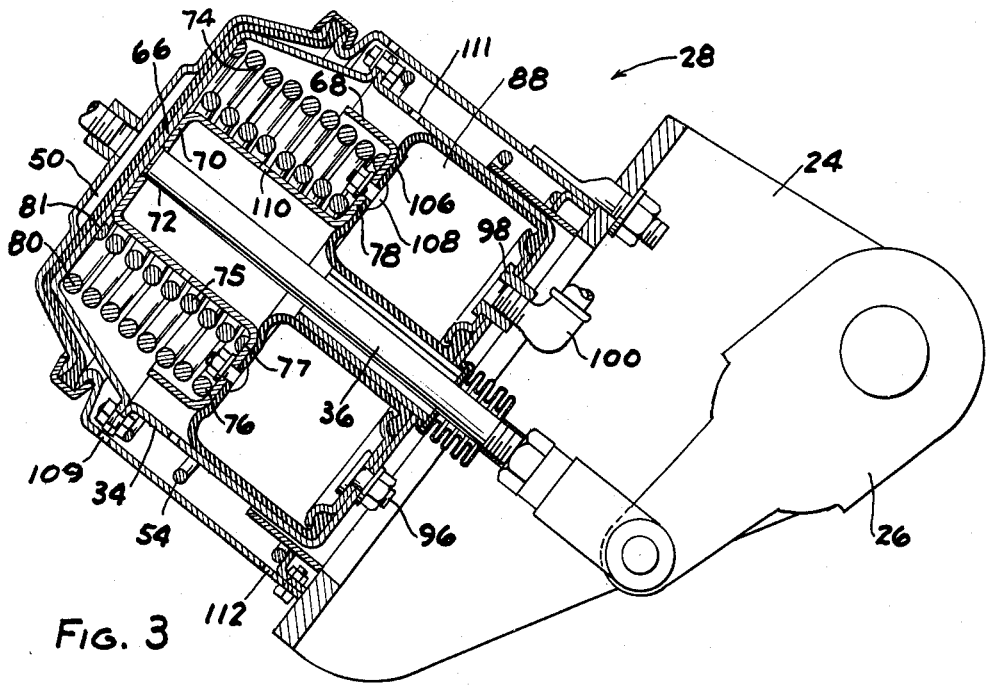
FIG. 3 is an enlarged sectional view taken on line 3—3 of FIG. 2 and illustrating the position of the parts when the brakes are off.

In use it may be assumed that braking structures 28 have been mounted on the vehicle in the manner described and that the fittings 52 and 100 respectively have been connected to air lines 114 and 116 in turn connected through suitable valving, not shown, into the air brake pressure system for the vehicle. The position of the parts when the vehicle is running with brakes off is shown in FIG. 3. Air pressure has been relieved from chamber 50 and air under pressure has been introduced into annular chamber 88. Spring 54 holds piston 34 in its retracted position. The pressure in chamber 88 has forced wall 106 upwardly as the drawing is viewed thereby forcing cup 68 and thrust rod 36 upwardly against the action of springs 74 and 75 until the top end portion 72 of the thrust rod abuts against the inner surface of piston head 66. Thrust rod 36 is thereby completely retracted, brake lever 26 is swung clockwise as the drawing is viewed and the brakes are off.

Figure 4:
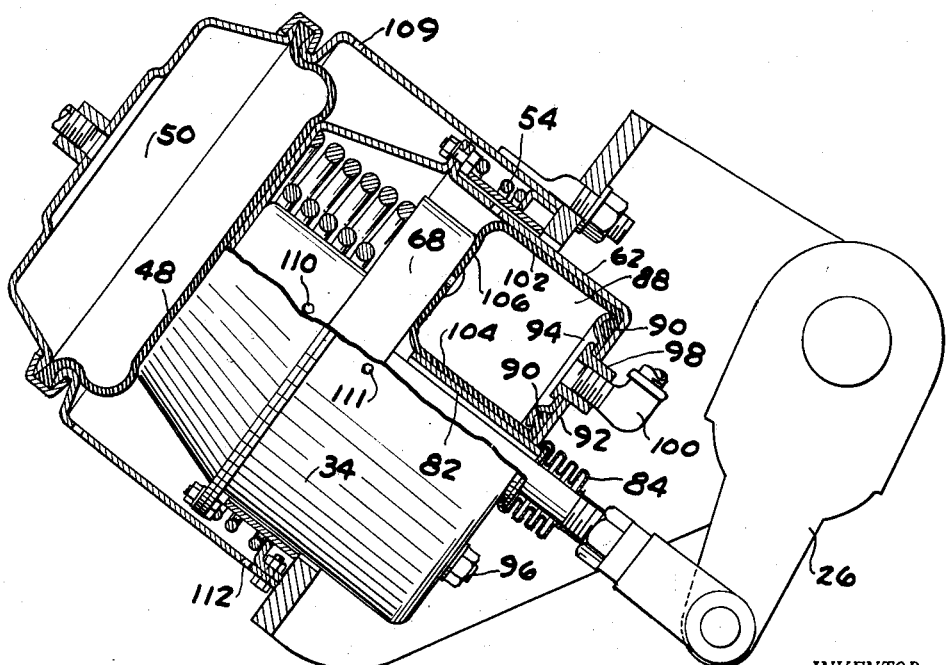
FIG. 4 is a view similar to FIG. 3 but showing a normal brakes on position.

Under a normal application of the brakes, air under pressure is introduced into chamber 50 so that diaphragm 48 forces piston 34 downwardly against the force of spring 54. This movement is transmitted directly to thrust rod 36 through interengagement of its end 72 with the piston head so that the thrust rod is moved downwardly thereby swinging brake lever 26 counter-clockwise to apply the brakes. This position of the parts is shown in FIG. 4. In a normal braking run no further braking action is required. To return the device to brakes-off position, pressure in chamber 50 is relieved and spring 54 returns the piston upwardly. The piston in turn moves cup 68 and thrust rod 36 upwardly to return braking lever 26 to the off position shown in FIG. 3. During normal braking, chamber 88, cup 68, and springs 74 and 75 are carried bodily by piston 34.

During an unusually long or severe braking run, the brakes frequently fade because parts of the brake structure heat up. It is imperative for the sake of safety that the braking structure be capable of additional braking action to compensate for the fade. More specifically it is imperative that means be provided for lengthening the effective stroke of thrust rod 36. It is desirable that this additional length of stroke be provided without materially increasing the magnitude of the braking force in order to avoid placing unduly heavy strain on the brake structure per se since this might damage the brakes, particularly in their heated, somewhat weakened condition. The mechanism contained within piston 34 provides additional stroke for thrust rod 36 without materially increasing the force which it exerts on brake lever 26.

Figure 6:
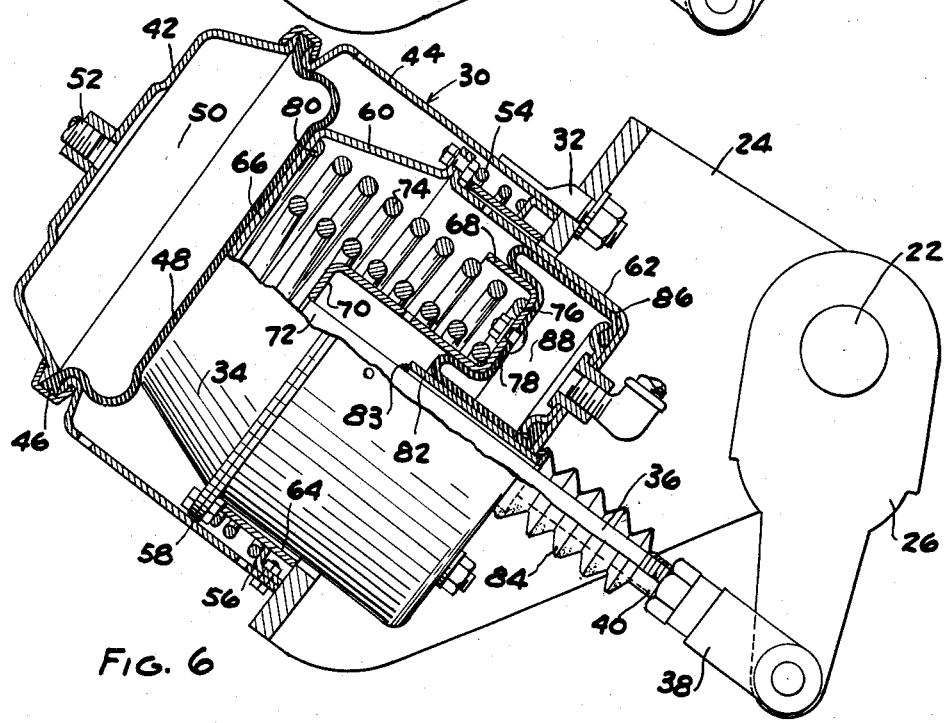
FIG. 6 is a view similar to FIG. 3 but showing the position of the parts during an extraordinary braking run.

When the brakes are initially applied, the parts move from the FIG. 3 position to the FIG. 4 position in the manner described. If the brakes then fade, the operator operates suitable valving, not shown, to relieve pressure in annular chamber 88. Springs 74 and 75 thereupon move top wall 106 of diaphragm 86 downwardly, permitting cup 68 and thrust rod 36 to move downwardly relative to both piston 34 and cylinder 30. The thrust rod swings brake lever 26 further counter-clockwise to compensate for brake fade and maintain proper action of the brakes. This position of the parts is illustrated in FIG. 6. It is to be noted that springs 74 and 75, in forcing cup 68 and thrust rod 36 downwardly, react against head 66 of the piston. Thus the springs exert no greater force on the thrust rod than is exerted on the thrust rod through the diaphragm and piston head. The danger of damage to the brakes during an extraordinary brake run is thereby minimized even though adequate braking action is maintained by the structure.

To return the brakes to their off position, pressure is again introduced into chamber 88 for forcing diaphragm wall 106, cup 68 and thrust rod 36 upwardly until the upper end 72 of the thrust rod abuts against piston head 66 as shown in FIG. 4. Pressure is then relieved in chamber 50 so that the parts return to the FIG. 3 position in the manner described.

Figure 5:
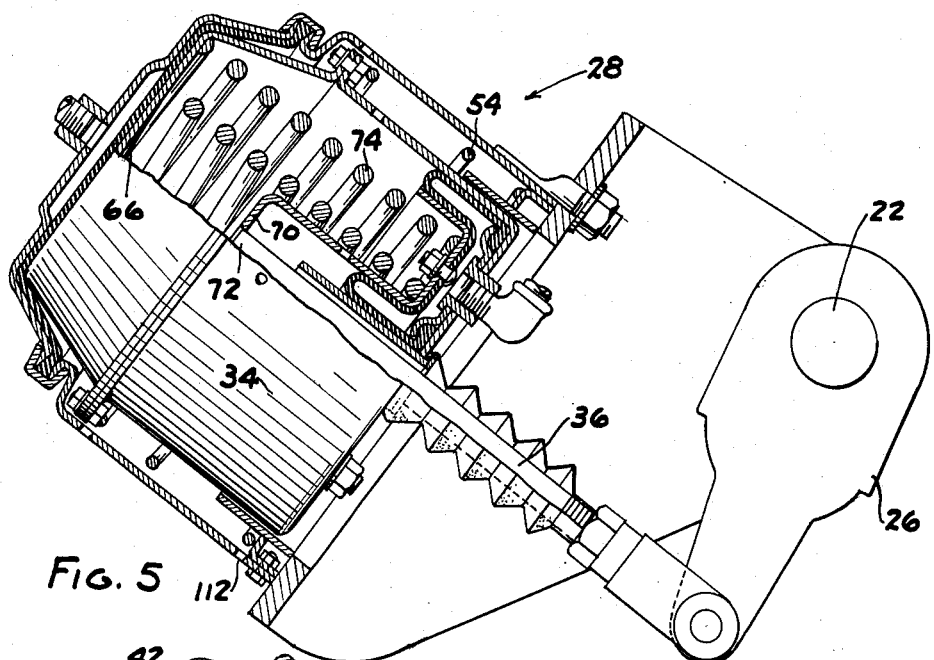
FIG. 5 is a view similar to FIG. 3 but showing a parking brake position.

The auxiliary braking means contained within the piston can also be used for parking brake purposes. To do this, pressure in annular chamber 88 is merely relieved so that springs 74 and 75 move cup 68 and the thrust rod downwardly for operating the brake lever as illustrated in FIG. 5. To release the parking brake, pressure is re-introduced into annular chamber 88 so that wall 106 again lifts cup 68 against the action of springs 74 and 75 until thrust rod end 72 abuts piston head 66. The parts are now again in their FIG. 3 position. Here again the magnitude of the braking force under springs 74 and 75 is no greater than that ordinarily exerted by piston 34 under the action of diaphragm 48 so that no unduly heavy strain is placed on the brakes.

The size and conformation of braking structures 28 according to this invention so closely approximates the size and conformation of conventional devices in wide spread use that the two can be used interchangeable on most motor vehicles equipped with air brakes without any appreciable modification of mounting means, fittings, etc.

I claim:

1. Brake operating structure comprising, means forming a fluid pressure motor having a cylinder member adapted to be mounted on a vehicle and a piston member operably connected with operating means adapted for connection with a vehicle brake, said motor members being operative upon pressure-induced relative movement thereof to actuate said operating means for applying primary brake force, spring means and a fluid pressure chamber carried bodily by said piston, said spring means being retained in stressed condition by a wall of said chamber, said chamber wall being movable relative to said piston under the force of said spring means responsive to pressure variations in said chamber, means forming an operative connection between said spring means and brake operating means, said spring means being biased to exert secondary brake applying force on said brake operating means and being operable responsive to the influence of said chamber wall to actuate said brake operating means independently of relative movement of said cylinder and piston members, said spring means reacting against said piston members so that said members form a support for the reaction to brake force exerted by said spring means.

2. Brake operating structure comprising, means forming a fluid pressure motor having a cylinder member adapted to be mounted on a vehicle and a piston member, means forming a thrust rod with an operative connection to said piston member and being adapted for connection to a vehicle brake, said motor members being operative upon fluid pressure-induced relative movement thereof to move said thrust rod for applying primary brake force, spring means and means forming a fluid pressure chamber bodily carried by said piston member, said chamber having a volume variable responsive to pressure changes therein and being operable to control stress in said spring means responsive to volume variations thereof, means forming a force transmitting connection between said spring means and thrust rod, said spring means being biased to exert secondary brake applying force on said thrust rod, said thrust rod being mounted for movement independent of said piston member and in a direction for applying and relieving brake force, said spring means being operable responsive to the influence of said pressure chamber to move said thrust rod independently of said cylinder and piston members, said piston and cylinder members forming a support for the reaction to brake force exerted by said spring means.

3. Brake operating structure comprising, a thrust rod adapted for operative connection to a brake mechanism, primary and secondary means for applying braking force to said thrust rod both independently and cooperatively, said primary means comprising means forming a fluid pressure motor having a cylinder member and a piston member, one of which is adapted to be anchored on a vehicle and the other of which carries said thrust rod, said thrust rod and other member having means which interengage to transmit primary braking force directly from said other member to said thrust rod upon actuation of said fluid pressure motor, said thrust rod being longitudinally movable relative to said other member, said secondary means including spring means and a fluid pressure expansible chamber carried bodily by said other member, said spring means being operatively connected to said thrust rod, said spring means being biased to urge said thrust rod in a direction for applying braking force to the brake mechanism, said chamber having a wall which is movable responsive to pressure changes in said chamber and which controls the stress in said spring means and the secondary brake force exerted by said spring means on said thrust rod, said spring means reacting against said other member so that said primary means forms a support for the reaction to braking force exerted by said secondary means.

4. Brake operating structure comprising, a fluid pressure motor having a cylinder member and a piston member one of which is adapted to be anchored on a vehicle, a thrust rod carried by the other member and being longitudinally movable relative to said other member, a fluid pressure expansible chamber carried by said other member and having an element movable responsive to pressure changes therein, means forming an operative connection between said spring means and thrust rod, operable to hold said thrust rod in interengaged relation with said other member for directly transmitting primary braking force from said other member to said thrust rod upon actuation of said fluid pressure motor, spring means compressed against said means on said thrust rod for urging said thrust rod in a direction for applying brake force against the action of said element, said element being movable under the force of said spring means responsive to relief of pressure in said chamber to facilitate movement of said thrust rod independently of said members under the action of said spring means for applying secondary brake force, said spring means reacting against said other member so that said motor members provide a support for the reaction to brake force applied by said spring means.

5. Brake operating structure comprising, a fluid pressure motor having a cylinder member with a diaphragm sealed therein, a piston member in said cylinder member engaged by said diaphragm so that said piston member can be moved by pressure introduced at one side of said diaphragm, one of said members being adapted to be anchored on a vehicle, a thrust rod carried by the other member and being longitudinally movable relative to said other member, a second diaphragm carried by said other member and forming a portion of a fluid pressure expansible chamber, said second diaphragm being movable responsive to pressure changes in said chamber, means forming an operative connection between said second diaphragm and said thrust rod operable to hold said thrust rod in engaged relation with said other member for directly transmitting braking force from said other member to said thrust rod upon introduction of pressure at said one side of the first mentioned diaphragm, spring means compressed between said other member and means on said thrust rod for urging said thrust rod in a direction for applying brake force against the action of said second diaphragm, said second diaphragm being movable under the force of said spring means responsive to relief of pressure in said chamber to facilitate movement of said thrust rod independently of said members under the action of said spring for applying brake force.

6. Brake operating structure comprising, a fluid pressure motor having a cylinder member and a piston member one of which is adapted to be anchored on a vehicle, a thrust rod carried by the other member and being longitudinally movable relative to said other member, an annular fluid pressure expansible chamber carried within said other member and having an annular element movable responsive to pressure changes therein, means forming an operative connection between said element and said thrust rod operable to hold said thrust rod in interengaged relation with said other member for directly transmitting braking force from said other member to said thrust rod upon actuation of said fluid pressure motor, a coil spring carried within said other member, said coil spring being compressed between said annular element and a portion of said other member spaced therefrom, means forming an operating connection between said coil spring and said thrust rod, said spring in stressed condition urging said thrust rod in a direction for applying brake force against the action of said annular element, said annular element being axially movable under the force of said coil spring responsive to relief of pressure in said chamber to facilitate movement of said thrust rod independently of said members under the action of said spring for applying brake force.

7. Brake operating structure comprising, a fluid pressure motor having a cylinder member and a piston member one of which is adapted to be anchored on a vehicle, a thrust rod carried by the other member and being longitudinally movable relative to said other member, an annular fluid pressure expansible chamber carried by said other member and having an annular element movable responsive to pressure changes therein, means forming an annular cup secured to said element and to said thrust rod so that said element is operable to hold said thrust rod in interengaged relation with said other member for directly transmitting braking force from said other member to said thrust rod upon actuation of said fluid pressure motor, a coil spring having one end portion engaged within said cup and having its other end portion engaged against a part of said other member spaced from said cup, said coil spring being stressed to urge said thrust rod in a direction for applying brake force against the action of said annular element, said annular element being axially movable under the force of said spring responsive to relief of pressure in said chamber to facilitate movement of said thrust rod independently of said members under the action of said spring for applying brake force.

8. Brake operating structure comprising, a fluid pressure motor having a cylinder member with a piston member movable therein and a diaphragm operably interposed between the cylinder member and piston member so that said piston member can be moved by pressure introduced at one side of said diaphragm, one of said members being adapted to be anchored on a vehicle, the other of said members carrying a thrust rod, a generally central guide on said other member through which said thrust rod longitudinally movably extends, a second diaphragm forming an annular fluid pressure expansible chamber carried by said other member, radially inner and outer portions of said diaphragm being confined respectively by portions of said guide and said other member, said diaphragm having a radially extending portion forming a wall which is axially movable responsive to pressure changes in said chamber, a cup-shaped element secured to said wall and to said thrust rod so that said wall is operable to hold said thrust rod in longitudinally interengaged relation with said other member for directly transmitting braking force from said other member to said thrust rod upon actuation of said fluid pressure motor, a coil spring seating within said cup-shaped element and engaging a portion of said other member, said spring being compressed for urging said thrust rod in a direction for applying brake force against the action of said wall, said wall being movable under the force of said spring responsive to relief of pressure in said chamber to facilitate movement of said thrust rod independently of said members under the action of said spring for applying brake force.

9. Brake operating structure comprising, means forming a fluid pressure motor having one member adapted to be mounted on a vehicle and another relatively movable member, means forming a thrust rod with an operative connection to said other member and being adapted for connection to a vehicle brake, said motor members being operative upon fluid pressure-induced relative movement thereof to move said thrust rod for applying primary brake force, said thrust rod being mounted for movement independent of said other member and in a direction for applying and relieving brake force, two devices carried bodily by said other member, means forming force-transmitting connections between said devices and said thrust rod, one of said devices being stressed to urge said thrust rod toward brake actuating condition for applying secondary brake force and the other of said devices exerting force on said thrust rod in opposition to the action of said first device, and means controlling the force exerted by said other device so that forces of said devices are regulable selectively to overcome each other to thereby operate the vehicle brakes independently of relative movement of said motor members, said motor members cooperating to provide a support for the reaction to brake actuating force exerted by said one device.

References Cited in the file of this patent
UNITED STATES PATENTS

| | | |
|---|---|---|
| 2,341,587 | Andres et al. | Feb. 15, 1944 |
| 2,907,415 | Norman | Oct. 6, 1959 |
| 2,936,785 | Hastings | May 17, 1960 |